(12) United States Patent
De Bree

(10) Patent No.: US 10,070,572 B2
(45) Date of Patent: Sep. 11, 2018

(54) MOBILE SOIL-WORKING DEVICE WITH PROTECTIVE MEANS

(71) Applicant: REDEXIM HANDEL—EN EXPLOITATIE MAATSCHAPPIJ B.V., AC Zeist (NL)

(72) Inventor: Cornelius Hermanus Maria De Bree, Driebergen (NL)

(73) Assignee: REDEXIM HANDEL—EN EXPLOITATIE MAATSCHAPPIJ B.V., Zeist (NL)

( * ) Notice: Subject to any disclaimer, the term of this patent is extended or adjusted under 35 U.S.C. 154(b) by 0 days.

(21) Appl. No.: 14/760,941

(22) PCT Filed: Jan. 15, 2014

(86) PCT No.: PCT/EP2014/050683
§ 371 (c)(1),
(2) Date: Jul. 14, 2015

(87) PCT Pub. No.: WO2014/111414
PCT Pub. Date: Jul. 24, 2014

(65) Prior Publication Data
US 2015/0342109 A1 Dec. 3, 2015

(30) Foreign Application Priority Data
Jan. 15, 2013 (EP) .................................... 13151318

(51) Int. Cl.
*A01B 45/02* (2006.01)
(52) U.S. Cl.
CPC ................... *A01B 45/023* (2013.01)
(58) Field of Classification Search
CPC ....... A01B 43/023; A01B 45/02; A01B 45/00; A01B 13/08; A01B 13/10; A01B 13/12
See application file for complete search history.

(56) References Cited

U.S. PATENT DOCUMENTS

| 3,136,274 A * | 6/1964 | Townsend ............ A01B 45/023 111/118 |
| 3,797,577 A * | 3/1974 | Killion ................. A01B 45/023 172/22 |

(Continued)

FOREIGN PATENT DOCUMENTS

| DE | 10 2005 021025 A1 | 10/2006 |
| EP | 0 037 595 A1 | 10/1981 |

(Continued)

OTHER PUBLICATIONS

Canadian Office Action dated Apr. 5, 2018, in connection with corresponding CA Application No. 2,897,765 (6 pgs.).

(Continued)

*Primary Examiner* — Robert E Pezzuto
*Assistant Examiner* — Adam J Behrens
(74) *Attorney, Agent, or Firm* — Maier & Maier, PLLC

(57) ABSTRACT

A mobile soil-working device, having a machine frame, a drive for at least one insertion tool that can be moved up and down and inserted into the ground and pulled out again, the insertion tool being in a starting position at a predefined insertion angle before insertion into the ground and when in the ground executing a pivoting movement, which is superposed on the up and down movement, about a first pivot axis in the direction of a first pivot direction owing to the movement of the machine frame in the direction of travel, and having a returning means, which is coupled to the insertion tool and moves the insertion tool back into the starting position after its exit from the ground by pivoting the insertion tool in a second pivoting direction opposite to the first pivoting direction.

10 Claims, 6 Drawing Sheets

(56) References Cited

U.S. PATENT DOCUMENTS

Figure 1:
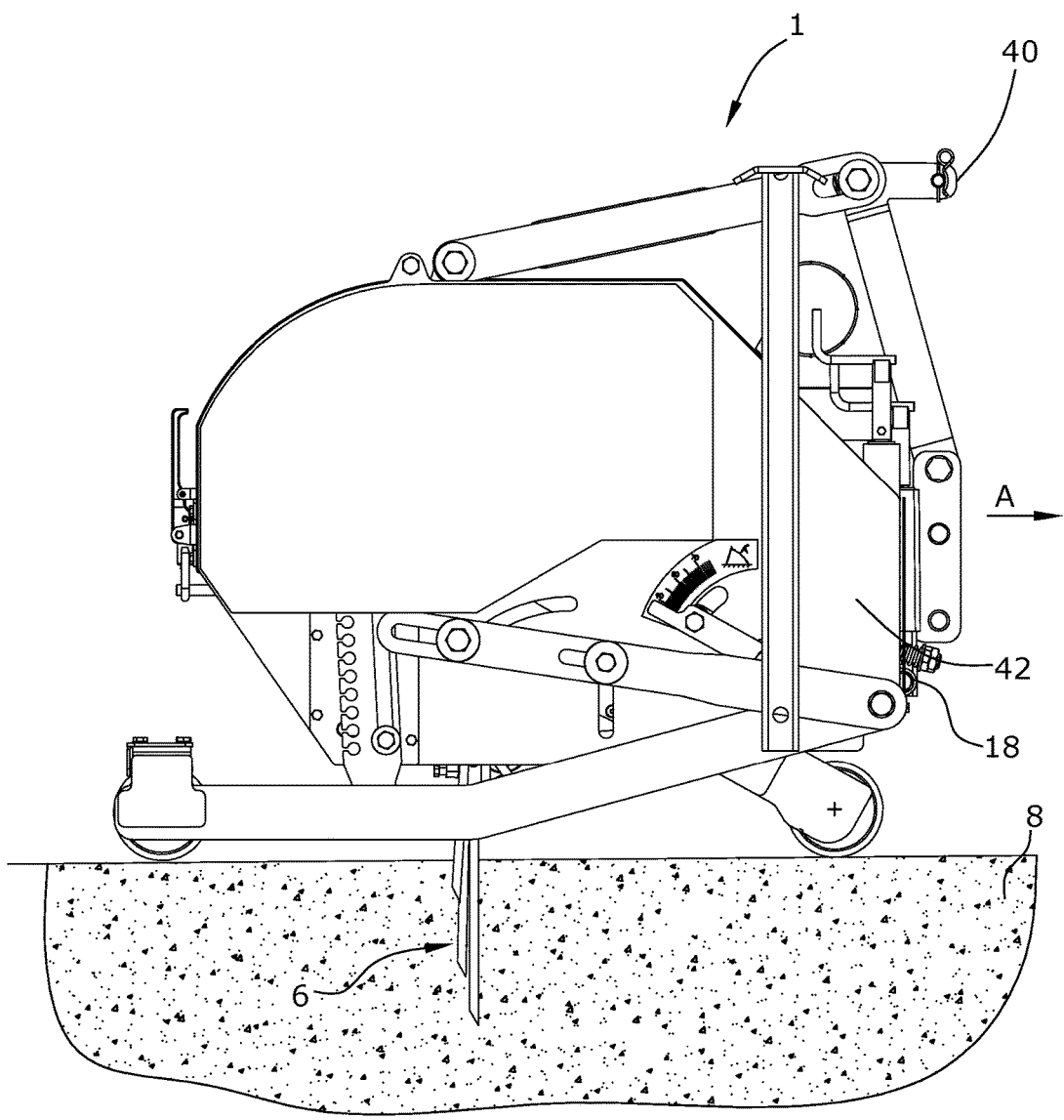

| | | | | |
|---|---|---|---|---|
| 4,753,298 A * | 6/1988 | Hansen | A01B 45/023 172/125 |
| 4,926,947 A * | 5/1990 | Cozine | A01B 45/023 172/22 |
| 5,193,624 A * | 3/1993 | Wiedenmann | A01B 45/023 172/84 |
| 5,398,767 A * | 3/1995 | Warke | A01B 45/023 172/125 |
| 5,469,922 A * | 11/1995 | Bjorge | A01B 45/02 172/123 |
| 5,570,746 A * | 11/1996 | Jones | A01B 45/023 172/22 |
| 5,810,092 A * | 9/1998 | Selvatici | A01B 45/023 172/21 |
| 6,003,613 A * | 12/1999 | Reincke | A01B 45/023 172/21 |
| 6,199,637 B1 * | 3/2001 | Wiedenmann | A01B 45/023 172/21 |
| 8,291,992 B2 * | 10/2012 | de Bree | A01B 45/023 172/21 |
| 8,376,062 B2 | 2/2013 | Wiedenmann | |
| 8,485,272 B2 * | 7/2013 | De Bree | A01B 45/023 172/125 |
| 8,561,713 B2 * | 10/2013 | De Bree | A01B 45/023 172/125 |
| 8,925,643 B2 * | 1/2015 | Georgoulias | A01B 45/023 172/21 |
| 2002/0189825 A1 * | 12/2002 | Livingstone | F16H 37/12 172/21 |
| 2005/0178567 A1 * | 8/2005 | Wiedenmann | A01B 71/06 172/21 |
| 2005/0263300 A1 * | 12/2005 | Banks | A01B 45/023 172/21 |
| 2008/0217034 A1 * | 9/2008 | de Bree | A01B 45/023 172/21 |
| 2008/0257571 A1 * | 10/2008 | Keane | A01B 45/023 172/21 |
| 2009/0200050 A1 * | 8/2009 | Bos | A01B 45/023 172/21 |
| 2009/0223686 A1 * | 9/2009 | Wiedenmann | A01B 45/023 172/48 |
| 2010/0288518 A1 * | 11/2010 | Reincke | A01B 45/023 172/21 |
| 2010/0294523 A1 * | 11/2010 | Wiedenmann | A01B 45/023 172/75 |
| 2011/0005783 A1 * | 1/2011 | Livingstone | A01B 45/023 172/1 |
| 2011/0024140 A1 * | 2/2011 | De Bree | A01B 45/023 172/21 |
| 2011/0042113 A1 * | 2/2011 | De Bree | A01B 45/023 172/21 |
| 2011/0061880 A1 * | 3/2011 | De Bree | A01B 45/023 172/1 |

FOREIGN PATENT DOCUMENTS

| | | |
|---|---|---|
| EP | 0 853 869 A1 | 7/1998 |
| EP | 2 106 679 A1 | 10/2009 |

OTHER PUBLICATIONS

International Search Report and Written Opinion dated Feb. 24, 2014 from corresponding International Application No. PCT/EP2014/050683; 8 pgs.

* cited by examiner

MOBILE SOIL-WORKING DEVICE WITH PROTECTIVE MEANS

Embodiments of the present invention relate to a mobile soil-working device.

Soil-working devices are known from prior art which comprise at least one machine frame, a drive for at least one insertion tool that can be moved upward and downward, the insertion tool being adapted to be inserted into the soil and be pulled out from the same. Prior to insertion into the soil, the insertion tool is in a starting position under a predetermined insertion angle and, due to the movement of the machine frame in the traveling direction, performs a pivot movement in the soil about a first pivot axis in the direction of a first pivoting direction, the pivot movement superposing the upward and downward movement. Further, a returning means is provided that is coupled to the insertion tool, which, after the insertion tool has left the soil, returns the insertion tool to the starting position by pivoting the insertion tool in a second pivoting direction opposite to the first pivoting direction.

From European Patent Publication EP-A-0037595 a soil-working device is known that has two carrying arms guided in a parallelogram-like manner and pivotably supporting a tool holder at one end, while the other end is pivotably supported at a machine frame. A pushrod of a crank drive is hinged to the tool holder and drives the same, so that it performs an up and down movement. One of the two carrying arms is variable in length and comprises a stop spring means. As soon as the insertion tool is outside the soil, the carrying arm is pulled to the stop by the spring force. With the insertion tool inserted and the soil-working device moving forward, the tool with the tool holder pivots against the traveling direction and the length-variable carrying arm is extended against the spring force.

However, the previously known soil-working devices have the drawback that the insertion tools may be damaged when they hit a hard object in the soil, such as a stone, for example.

Therefore, it is an object of the present invention to provide a soil-working device and a method for working a soil surface, wherein the soil-working device is protected from damage when the at least one insertion tool hits a hard object in the soil.

The invention advantageously provides that the returning means is coupled to a protective means that allows the insertion tool to be pivoted in the second pivoting direction beyond the starting position so that, by pivoting the insertion tool in the second pivoting direction, the insertion tool can be pivoted beyond the starting position when it hits a hard object in the ground.

This has the advantage that the insertion tool can evade the object also in the second pivoting direction although the insertion tool is already in the starting position. Owing to the evasion movement performed by the insertion tool, neither the machine nor the insertion tool will suffer any serious damage.

A stop may be provided that limits the pivoting of the insertion tool in the second pivoting direction when the starting position is reached.

The returning means coupled to the at least one insertion tool may be coupled to the protective means via a second pivot joint. The returning means may be coupled to the insertion tool via a third pivot joint. The returning means is preferably arranged between the insertion tool and the protective means.

The protective means may comprise at least a first pivot arm and a spring means, wherein the first pivot arm is adapted to be pivoted in a third pivoting direction against the spring force of the spring means, wherein the returning means is coupled to the first pivot arm of the protective means via the second pivot joint.

The second pivot joint of the returning means may be adapted to be moved when the insertion tool is pivoted beyond the starting position, so that the first pivot arm of the protective means, which is coupled to the second pivot joint, can be pivoted in a third pivoting direction against the spring force of the spring means of the protective means.

The spring force of the spring means of the protective means may be chosen such that the protective means allows the movement of the insertion tool beyond the starting position only when a force is exerted on the insertion tool that exceeds a certain force.

In this manner it is ensured that the insertion tool can be moved beyond the starting position only when a great force is exerted on the insertion tool, such as when hitting a hard object in the soil, for example.

At least one tool holder may be provided for the at least one insertion tool, the tool holder being supported about the first pivot axis in the guide arm adapted to be moved up and down by the drive.

A plurality of insertion tools may be mounted to one tool holder.

A plurality of tool holders may be arranged side by side, each having a plurality of insertion tools mounted thereto, wherein one returning means is coupled to one tool holder, respectively, while the returning means are respectively coupled to a protective means.

This has the advantage that, if only one insertion tool or a plurality of insertion tools of a tool holder hit a hard object in the soil, only this tool holder may evade. The other insertion tools can continue their normal operation.

The first pivot arm of the protective means may be adapted to be pivoted in the third pivoting direction against the spring force of the spring means, wherein a protective means stop is provided that limits the pivoting of the first pivot arm in the fourth pivoting direction that is opposite to the third pivoting direction.

According to the present invention, a method for working soil may further be provided, the method having the following steps:
 pulling or driving a soil-working device over a soil surface,
 inserting and pulling at least one insertion tool into and out from the soil, the insertion tool being coupled to a machine frame,
 wherein, prior to insertion into the soil, the insertion tool is in a starting position under a predefined insertion angle and, when in the ground, performs a pivoting movement about a first pivot axis in the direction of a first pivoting direction due to the movement of the machine frame in the traveling direction, the pivoting movement superposing the up and down movement,
 wherein, after having left the soil, the insertion tool is returned back to the starting position by pivoting the insertion tool in a second pivoting direction opposite to the first pivoting direction.

It is advantageously provided that, when hitting a hard object in the soil, the insertion tool is pivoted beyond the starting position by pivoting the insertion tool in the second pivoting direction.

The insertion tool may be pivoted beyond the starting position when a force is exerted on the insertion tool that exceeds a predetermined force.

The following is a detailed description of an embodiment of the invention with reference to the drawings.

Figure 2:
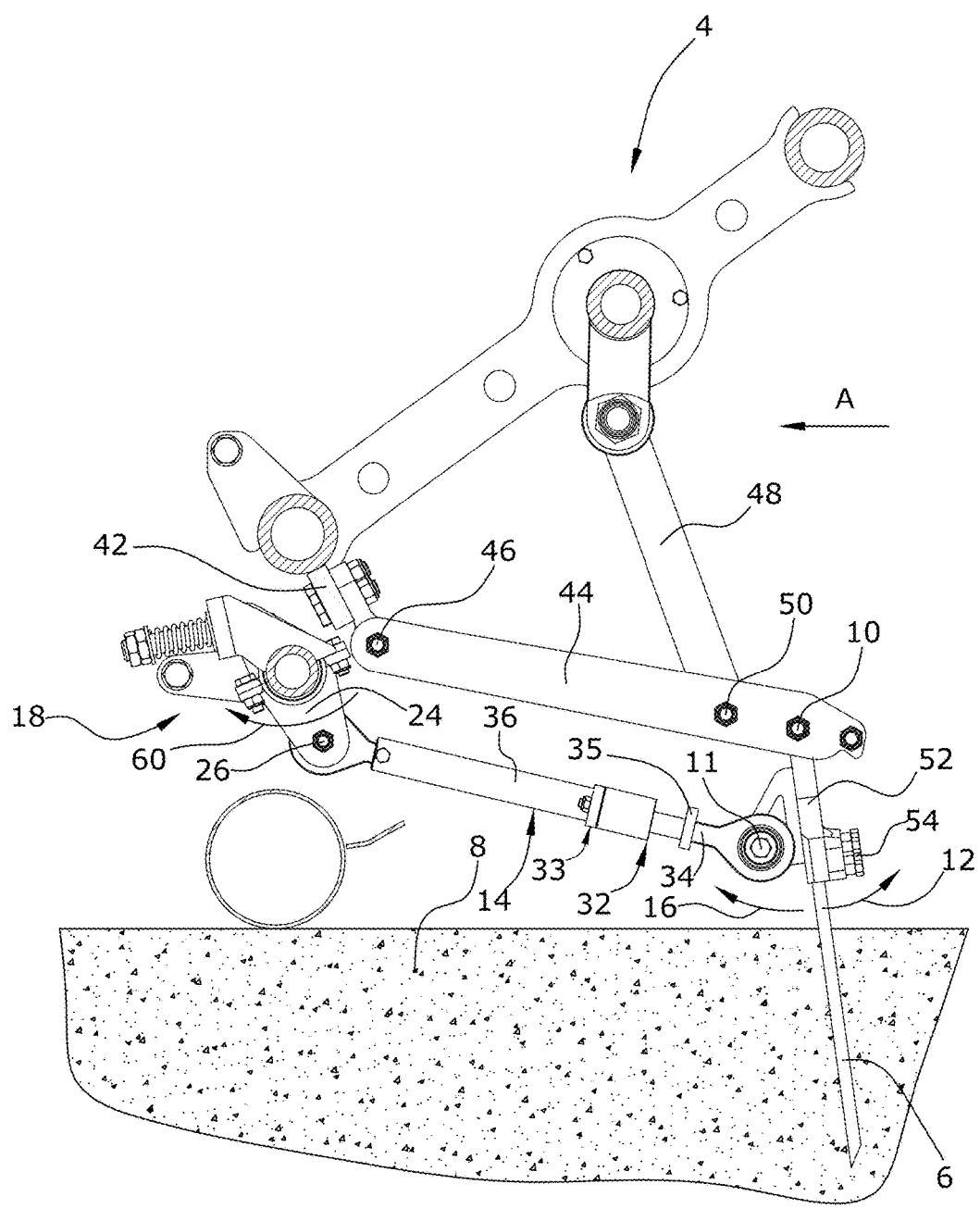
Figure 3:
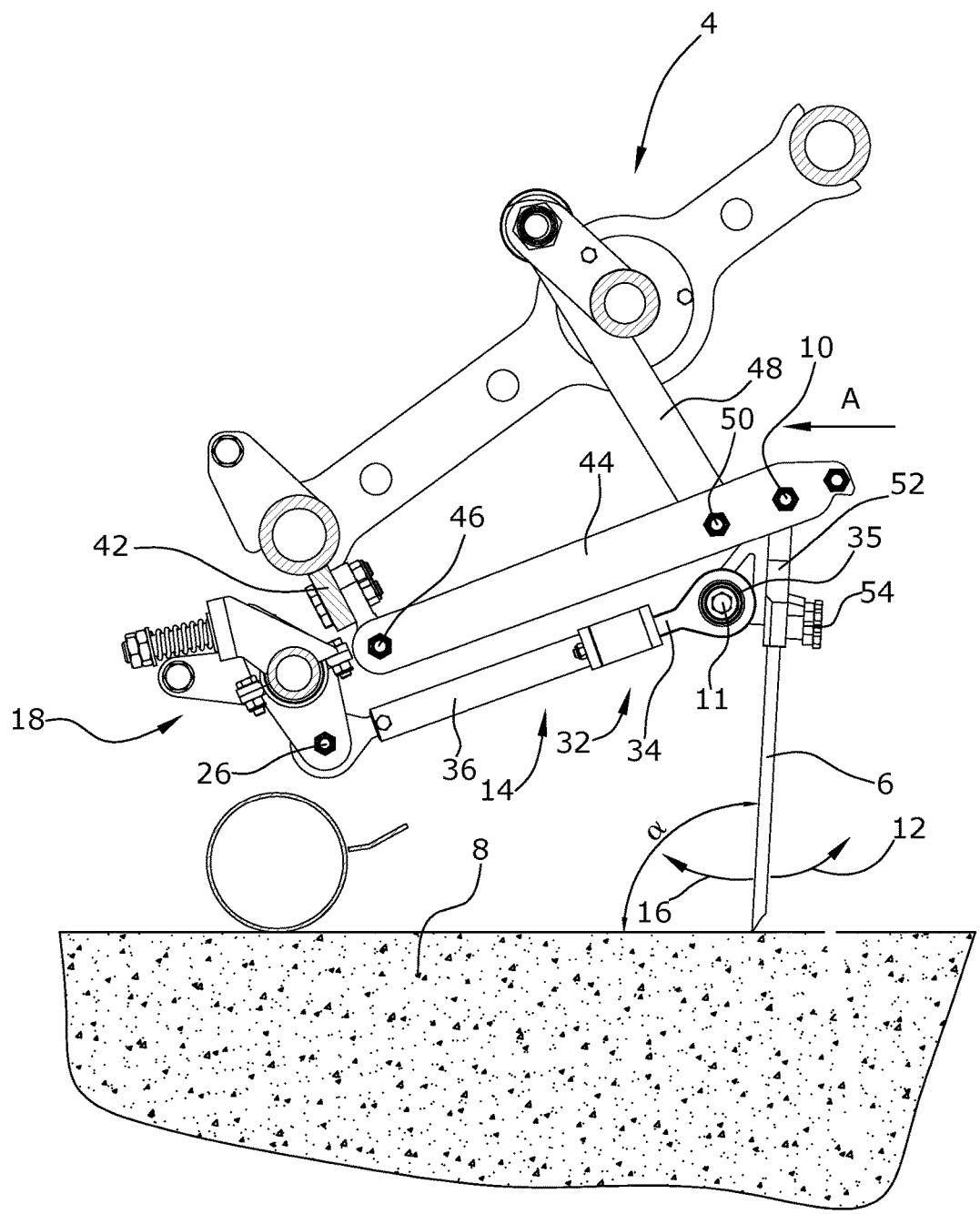
Figure 4:
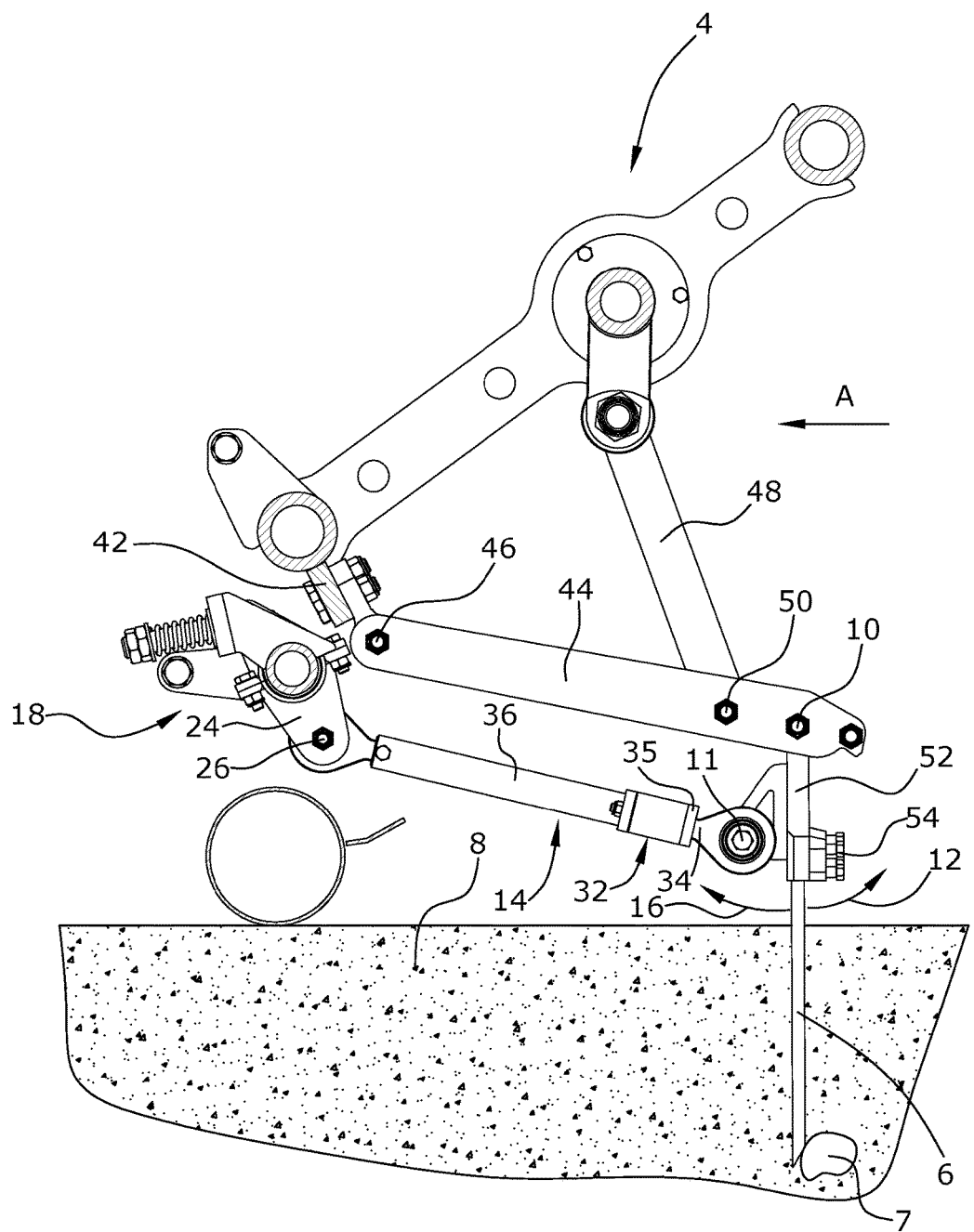
Figure 5:
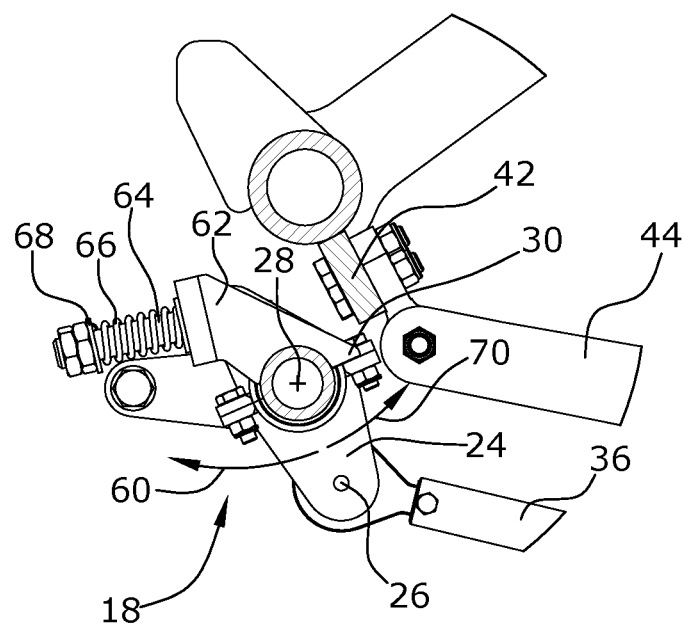
Figure 6:
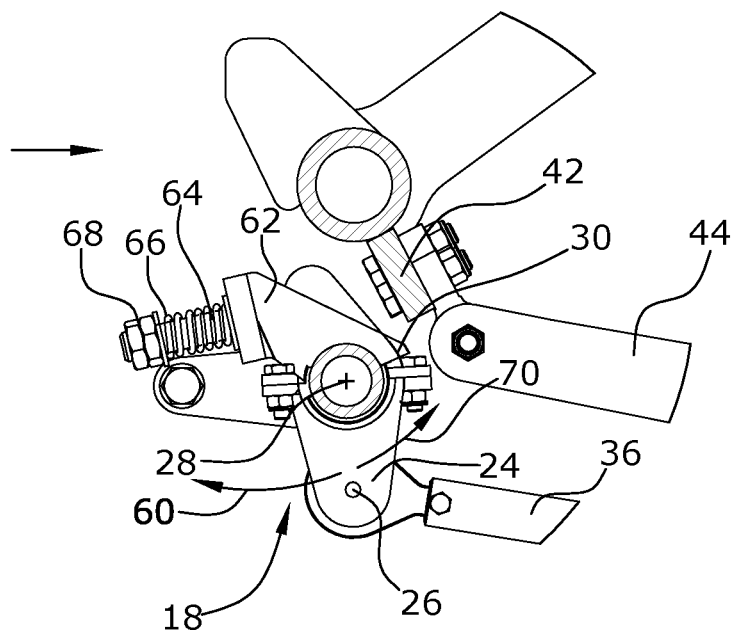
Figure 7:
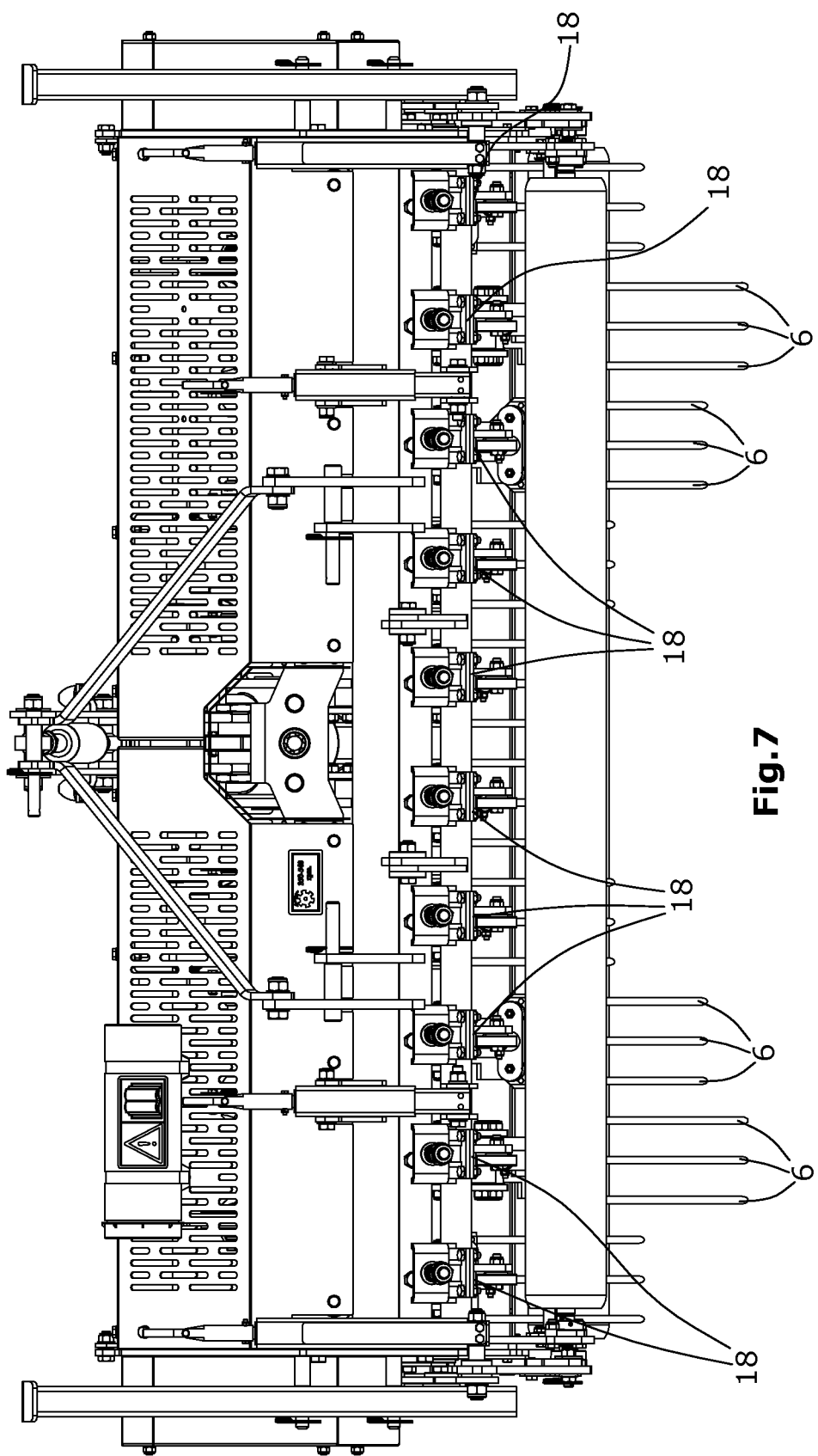

The Figures schematically show:

FIG. 1 a soil-working device in side view,

FIG. 2 a soil-working device with an insertion tool pivoted and inserted,

FIG. 3 a soil-working device just before the insertion of the insertion tool,

FIG. 4 a soil-working device hitting a hard object in the soil,

FIG. 5 an enlarged illustration of the protective means,

FIG. 6 the protective means in the pivoted state,

FIG. 7 a rear view of the soil-working device of FIGS. 1-6.

FIG. 1 is a side view of a soil-working device 1. The soil-working device 1 comprises a coupling means 40 by which the soil-working device 1 can be coupled to a towing vehicle and be pulled by the towing vehicle. As an alternative, the soil-working device 1 could also be self-propelled.

The soil-working device comprises a machine frame 42. Further, the soil-working device 1 comprises a drive 4 for at least one insertion tool 6 that can be moved up and down. In the present embodiment a plurality of insertion tools 6 is provided. The insertion tools 6 may be inserted into the soil and be pulled out therefrom. Prior to insertion into the soil, the insertion tools 6 are in a starting position under a predefined insertion angle and, when in the soil 8, they perform a pivoting movement about a first pivot axis 10 in the direction of a first pivoting direction 12, due to the movement of the machine frame 42 in the traveling direction A, the pivoting movement superposing the up and down movement.

FIG. 2 schematically shows a side view on drive 4 for an insertion tool 6 adapted to be moved up and down. A guide arm 44 is hingedly supported at the machine fame 42 around an axis 48. By the pushrod 48, the guide arm 44 is hingedly coupled to the drive 4, which is a crank drive, via the joint 50. The drive 4 drives the guide arm 44 by the pushrod 48. The guide arm 44 is moved up and down due to the drive 4.

At the end of the guide arm 44 opposite the pivot axis 46, a tool holder 52 is supported around a first pivot axis 10. At least one insertion tool 6 is mounted to the tool holder 52 by means of a fastening device 54. Preferably, a plurality of insertion tools 6 is mounted to the tool holder 52. In the embodiment illustrated, three insertion tools 6 are fastened to the tool holder 52. Due to the movement of the machine frame 42 in the traveling direction A, the at least one insertion tool 6 performs a pivoting movement about the first pivoting axis 10 in the direction of the first pivoting direction 12, which pivoting movement superposes the up and down movement.

Further, a returning means 14 is coupled to the tool holder 52 via a joint 11. The returning means illustrated is preferably arranged in a parallelogram-like manner beside the guide arm 44. The returning means 14 illustrated is preferably a piston-cylinder unit. The returning means 14 comprises the piston element 34 which is a piston rod. Further, the returning means 14 comprises the cylinder element 36. A compression spring, not illustrated herein, is arranged in the cylinder element 36. When the at least one insertion tool 6 is pivoted in the first pivoting direction 12 in the soil, the piston element 34 is drawn from the cylinder element 36, whereby the compression spring arranged in the cylinder element 36 is compressed. Thus, the at least one insertion tool 6 can be pivoted in the soil in the first pivoting direction 12 against the spring force of the spring of the returning means 14.

At the end opposite the joint 11, the returning means 14 is coupled to a protective means 18 via a second pivot joint 26. The protective means 18 will be explained in more detail with reference to FIGS. 5 and 6.

FIG. 2 illustrates a state in which the insertion tool 6 is pivoted in the direction of the first pivoting direction 12. As can be seen in FIG. 2, the piston element 34 has been pulled out from the cylinder element 36. A stop 33 is provided at the cylinder element 36, the stop having a damping means 32. Further, the piston element 34 comprises a flange 35.

After the tool has left the soil 8, the returning means 14 coupled to the insertion tool 6 moves the insertion tool 6 back to the starting position by pivoting the insertion tool 6 in a second pivoting direction 16 opposite to the first pivoting direction 12. FIG. 3 illustrates a state in which the insertion tool 6 has already been pulled from the soil 8 and has been returned to the starting position by the returning means 14. In the starting position, the stop 33 limits the pivoting of the insertion tool 6 in the second pivoting direction 16. In the embodiment illustrated, this is realized by the flange 35 resting on the damping means 32 of the stop 33. Prior to being inserted into the soil 8, the insertion tool 6 illustrated is in the starting position under a predefined insertion angle α.

In FIG. 4, the insertion tool 6 is again inserted in the soil. FIG. 4 illustrates a state in which the insertion tool 6 hits a hard object, which in the present instance is a stone 7. Thereby, the insertion tool 6 is pivoted in the direction of the second pivoting direction 16. FIG. 4 illustrates a state in which the flange 35 already rests on the damping means 32 of the stop 33. Thus, the stop 33 already limits the pivoting of the insertion tool in the second pivoting direction 16, and the insertion tool 6 is in the starting position.

However, the present invention advantageously provides that the returning means 14 is coupled to a protective means 18. This protective means 18 allows the insertion tool 6 to be pivoted in the second pivoting direction 16 beyond the starting position, so that, when hitting a hard object in the soil 8, e.g. the stone 7, the insertion tool 6 can be pivoted beyond the starting position by pivoting to insertion tool 6 in the second pivoting direction.

The protective means 18 is illustrated in more detail in FIGS. 5 and 6. The returning means 14 coupled to the at least one insertion tool 6 is coupled to the protective means 18 via a second pivot joint 26. The protective means 18 has at least a first pivot arm 24 and a spring means 22, wherein the first pivot arm 24 is adapted to be pivoted in the third pivoting direction 60 against the spring force of the spring means 22. Here, the first pivot arm 24 pivots about the pivot axis 28. In doing so, as illustrated in FIG. 6, the spring of the spring means 22 is compressed. The spring 66 of the spring means 22 is arranged on a bolt 64. The bolt 64 is moved by the movement of the pivot arm 24 that extends on both sides of the pivot axis 28 and is coupled to the bolt 64. Thereby, the element 68 is moved towards the element 62, whereby the spring 66 is compressed.

The returning means 14 coupled to the pivot arm 24 via the second pivot joint 26. When the insertion tool 6 hits a hard object 7 and the insertion tool 6 already is in the starting position, the insertion tool 6 can be moved in the second pivoting direction 16 beyond the starting position. Thereby, also the returning means 14 and thus the pivot joint 26 are moved. The returning means 14 and the pivot joint 26 pivot the first pivot arm 24 in the direction of the third pivoting direction 60. The pivot arm 24 is pivoted against the spring force of the spring 66 of the spring means 22. In this manner, the insertion tool 6 can evade the hard object, such as the stone 7, and damage to the soil-working device 1 can be avoided. The spring force of the spring means 22 of the protective means 18 is chosen such that the protective means 18 allows the insertion tool 6 to be moved beyond the starting position only when a force is exerted on the insertion tool that exceeds a predetermined force. Such a predetermined force only occurs when the insertion tool 6 hits a hard object in the soil 8, such as a stone 7. The predetermined force is determined by several trials in different grounds.

After the insertion tool 6 has been pulled from the soil 8 and has been moved upward again, the spring force of the spring 66 of the spring means 22 moves first pivot arm 24 back in a fourth pivoting direction 70 opposite to the third pivoting direction 60 until a portion of the pivot arm 24 abuts a stop 30 of the protective means which limits the movement in the fourth pivoting direction 70. The stop 30 of the protective means is arranged at the element 62. If the pivot arm 24 already rests on the stop 30 of the protective means, the first pivot arm 24 cannot be pivoted further in the direction of the fourth pivoting direction, due to the stop 30.

When the insertion tool 6 hits a hard object and is pivoted in the first pivoting direction 12 instead of the second pivoting direction, this may also be achieved, since, due to the spring provided therein, the returning means 14 enables a pivoting in the first pivoting direction 12. Thus, damage to the soil-working device 1 is avoided also in this case.

From FIG. 7, which is a rear view on the soil-working device 1, it can be seen that a plurality of tool holders 52 are arranged side by side, each having a plurality of insertion tools 6 mounted thereto. A respective returning means 14 is coupled to one tool holder 52, respectively, wherein the returning means 14 is coupled to a respective protection means 18.

This has the advantage that a plurality of protective means 18 are provided so that, when individual insertion elements 6 hit a hard object, only the protective means 18 is operated that is connected with the associated tool holder 52. Further, individual protective means 18 can be replaced individually, should they be worn down.

The soil-working device 1 described above and the associated method make it possible to avoid damage to the soil-working device 1 caused by the insertion tools 6 hitting a hard object in the soil 8. The impact can merely cause minor damage to the insertion tools 6. However, the insertion tools 6 are easy to replace.

The invention claimed is:

1. A mobile soil-working device comprising:
a machine frame,
a drive for at least one insertion tool that is capable of being moved up and down and inserted into the ground and pulled out again,
the insertion tool being in a starting position at a predefined insertion angle (α) before insertion into the ground and, when in the ground, executing a pivoting movement, which is superposed on the up and down movement, about a first pivot axis in the direction of a first pivoting direction owing to the movement of the machine frame in the direction of travel,
at least one returning means, which is coupled to the insertion tool and moves the insertion tool back into the starting position after its exit from the ground by pivoting the insertion tool in a second pivoting direction opposite to the first pivoting direction,
wherein the returning means is coupled to at least one protective means, which allows pivoting of the insertion tool in the second pivoting direction beyond the starting position, such that the insertion tool is capable of being pivoted beyond the starting position by pivoting of the insertion tool in the second pivoting direction when it hits a hard object in the ground;
wherein a stop is provided that limits the pivoting of the insertion tool in the second pivoting direction when the starting position is reached; and
wherein a spring force of a spring means of the protective means is chosen such that the protective means allows the movement of the insertion tool beyond the starting position only when a force is exerted on the insertion tool that exceeds a predetermined force, wherein a plurality of tool holders are arranged side by side, each having a plurality of insertion tools mounted thereto, wherein one returning means is coupled to one tool holder, respectively, wherein a plurality of individual protective means are provided such that the plurality of individual protective means is coupled to each returning means and tool holder.

2. The soil-working device of claim 1, wherein the returning means coupled to the at least one insertion tool is coupled to the protective means via a second pivot joint.

3. The soil-working device of claim 1, wherein the protective means comprises at least a first pivot arm, wherein the first pivot arm is adapted to be pivoted in a third pivoting direction against the spring force of the spring means, wherein the returning means is coupled to the first pivot arm of the protective means via a second pivot joint.

4. The soil-working device of claim 3, wherein the second pivot joint of the returning means is adapted to be moved when the insertion tool is pivoted beyond the starting position, so that the first pivot arm of the protective means, which is coupled to the second pivot joint, can be pivoted in the third pivoting direction against the spring force of the spring means of the protective means.

5. The soil-working device of claim 1, wherein the returning means is a piston-cylinder unit.

6. The soil-working device of claim 1, wherein the tool holder is supported about the first pivot axis in a guide arm adapted to be moved up and down by the drive.

7. The soil-working device of claim 1, wherein a first pivot arm of the protective means is adapted to be pivoted in a third pivoting direction against the spring force of the spring means, wherein a protective means stop is provided that limits the pivoting of the first pivot arm in a fourth pivoting direction that is opposite to the third pivoting direction.

8. A method for working soil comprising:
pulling or driving a soil-working device over a soil surface,
inserting and pulling at least one insertion tool into and out from the soil, the insertion tool being coupled to a machine frame,
wherein, prior to insertion into the soil, the insertion tool is in a starting position under a predefined insertion angle (α) and, when in the ground, performs a pivoting movement about a first pivot axis in the direction of a first pivoting direction due to the movement of the machine frame in the traveling direction, the pivoting movement superposing the up and down movement,
wherein, after having left the soil, the insertion tool is returned back to the starting position with the aid of at least one returning means by pivoting the insertion tool in a second pivoting direction opposite to the first pivoting direction, and wherein hitting a hard object in the soil, the insertion tool is pivoted beyond the starting position by pivoting the insertion tool in the second pivoting direction by the aid of at least one protective means;

wherein the insertion tool is pivoted beyond the starting position when a force is exerted on the insertion tool that exceeds a predetermined force; and wherein a plurality of tool holders are arranged side by side, each having a plurality of insertion tools mounted thereto, wherein one returning means is coupled to one tool holder, respectively, wherein a plurality of protective means are provided and an individual protective means in the plurality of protective means is coupled to each returning means and tool holder.

9. A mobile soil-working device comprising:

a machine frame, a drive for at least one insertion tool that is capable of being moved up and down and inserted into the ground and pulled out again, the insertion tool being in a starting position at a predefined insertion angle ($\alpha$) before insertion into the ground and, when in the ground, executing a pivoting movement, which is superposed on the up and down movement, about a first pivot axis in the direction of a first pivoting direction owing to the movement of the machine frame in the direction of travel, at least one returning means, which is coupled to the insertion tool and moves the insertion tool back into the starting position after its exit from the ground by pivoting the insertion tool in a second pivoting direction opposite to the first pivoting direction, at least one protective means, wherein the returning means is coupled to the protective means, which allows pivoting of the insertion tool in the second pivoting direction beyond the starting position, such that the insertion tool is capable of being pivoted beyond the starting position by pivoting of the insertion tool in the second pivoting direction when it hits a hard object in the ground;

wherein a stop is provided that limits the pivoting of the insertion tool in the second pivoting direction when the starting position is reached; and wherein a spring force of a spring means of the protective means is chosen such that the protective means allows the movement of the insertion tool beyond the starting position only when a force is exerted on the insertion tool that exceeds a predetermined force, wherein a plurality of tool holders are arranged side by side, each having a plurality of insertion tools mounted thereto, wherein one returning means and one protective means is coupled to one tool holder, respectively, wherein an individual protective means is coupled to each returning means and tool holder.

10. A method for working soil comprising:

pulling or driving a soil-working device over a soil surface, inserting and pulling at least one insertion tool into and out from the soil, the insertion tool being coupled to a machine frame, wherein, prior to insertion into the soil, the insertion tool is in a starting position under a predefined insertion angle ($\alpha$) and, when in the ground, performs a pivoting movement about a first pivot axis in the direction of a first pivoting direction due to the movement of the machine frame in the traveling direction, the pivoting movement superposing the up and down movement, wherein, after having left the soil, the insertion tool is returned back to the starting position with the aid of at least one returning means by pivoting the insertion tool in a second pivoting direction opposite to the first pivoting direction, and wherein hitting a hard object in the soil, the insertion tool is pivoted beyond the starting position by pivoting the insertion tool in the second pivoting direction by the aid of at least one protective means;

wherein the insertion tool is pivoted beyond the starting position when a force is exerted on the insertion tool that exceeds a predetermined force; and wherein a plurality of tool holders are arranged side by side, each having a plurality of insertion tools mounted thereto, wherein one returning means and one protective means is coupled to one tool holder, respectively, wherein an individual protective means is coupled to each returning means and tool holder, wherein the individual protective means is coupled to the returning means in such a manner as to allow pivoting of the insertion tool in the second pivoting direction beyond the starting position.

* * * * *